(12) United States Patent
McCormack

(10) Patent No.: US 10,395,568 B2
(45) Date of Patent: Aug. 27, 2019

(54) SYSTEM AND APPARATUS FOR RELIABLY POWERING A SIGN USING SOLAR POWER

(71) Applicant: Judd McCormack, Auroria, IL (US)

(72) Inventor: Judd McCormack, Auroria, IL (US)

( * ) Notice: Subject to any disclaimer, the term of this patent is extended or adjusted under 35 U.S.C. 154(b) by 155 days.

(21) Appl. No.: 15/626,606

(22) Filed: Jun. 19, 2017

(65) Prior Publication Data

US 2018/0366043 A1 Dec. 20, 2018

(51) Int. Cl.
| | |
|---|---|
| G09F 13/00 | (2006.01) |
| H02J 7/35 | (2006.01) |
| H02J 7/00 | (2006.01) |
| G09F 27/00 | (2006.01) |
| G09F 13/04 | (2006.01) |
| G09F 15/00 | (2006.01) |

(52) U.S. Cl.
CPC ............. *G09F 13/00* (2013.01); *G09F 13/04* (2013.01); *G09F 15/0037* (2013.01); *G09F 27/007* (2013.01); *H02J 7/0021* (2013.01); *H02J 7/35* (2013.01)

(58) Field of Classification Search
CPC ...... G09F 13/00; G09F 13/04; G09F 15/0037; G09F 27/007; H02J 7/0021; H02J 7/35
See application file for complete search history.

*Primary Examiner* — Hal Kaplan
(74) *Attorney, Agent, or Firm* — The Law Offices of Konrad Sherinian, LLC

(57) ABSTRACT

A reliable solar powered sign system is disclosed and claimed. The solar powered sign system includes an electric sign, a solar array, and a pair of battery banks. The battery banks are generally coupled a control unit. The control includes a first charge controller, a second charge controller, and a logic board. The first battery bank is coupled to the first charge controller, and the second battery bank is coupled to the second charge controller. The logic board monitors an operational state of the first charge controller and the second charge controller, and, based on the operational state of the first charge controller and the operational state of the second charge controller, couples one of the charge controllers to the electric sign.

19 Claims, 4 Drawing Sheets

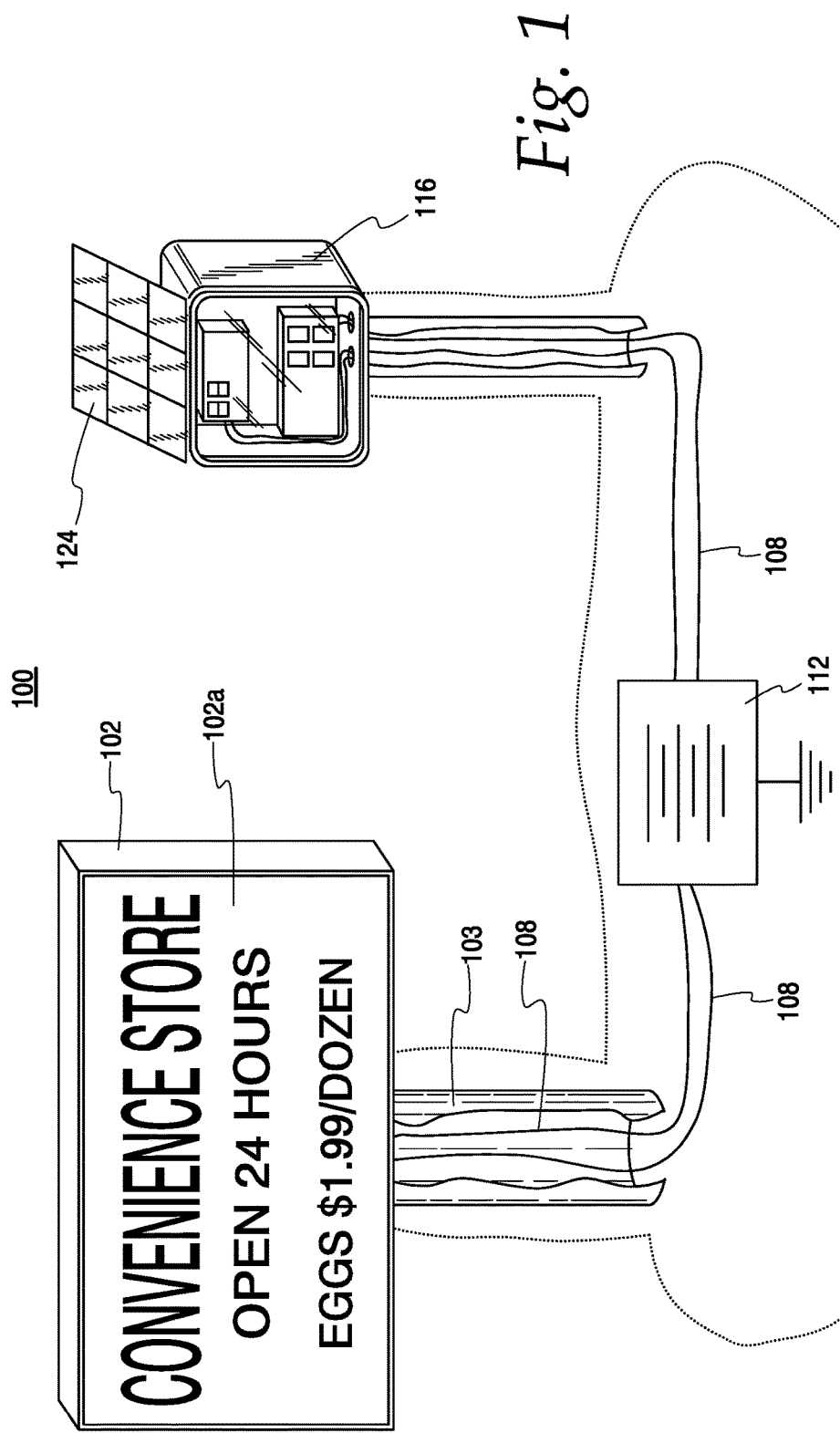

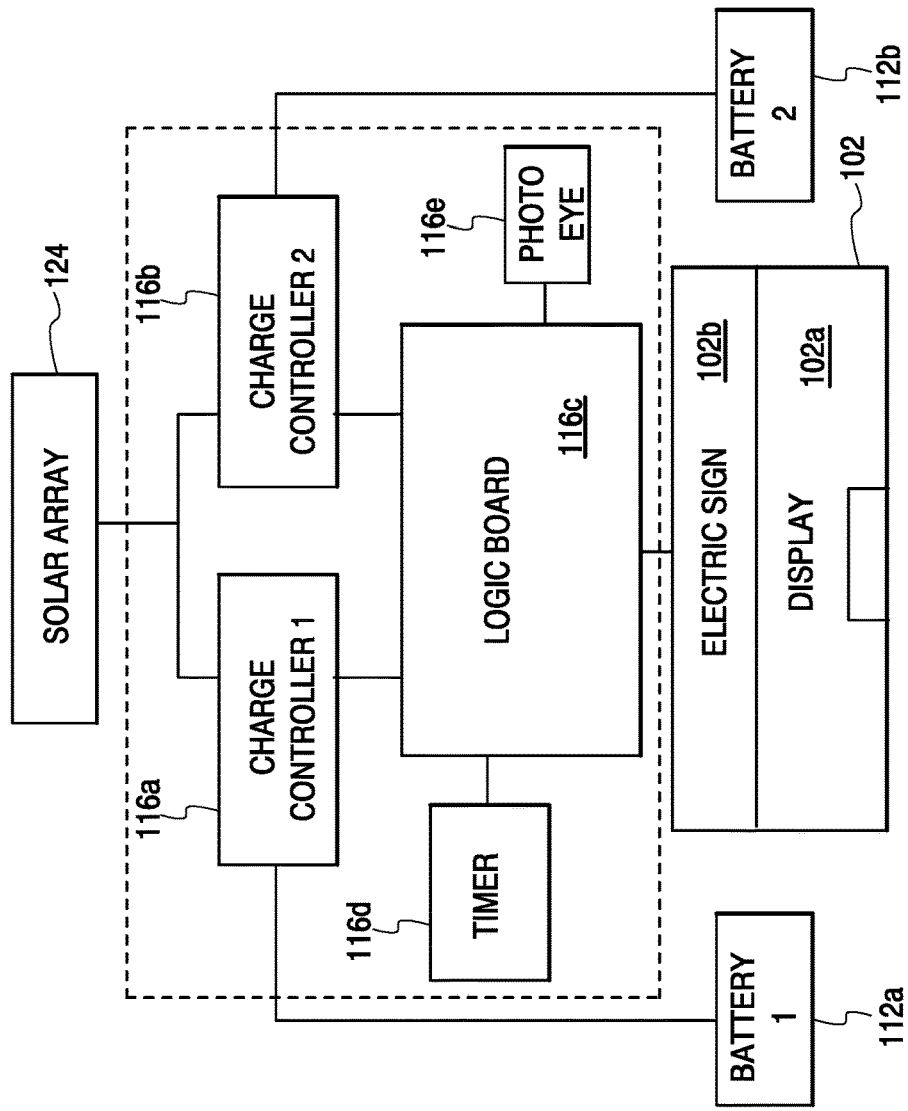

SYSTEM AND APPARATUS FOR RELIABLY POWERING A SIGN USING SOLAR POWER

CROSS REFERENCE TO RELATED APPLICATIONS

NONE.

FIELD OF THE DISCLOSURE

The present disclosure concerns providing lighting for signs and particularly providing power for signs using solar power, and more particularly still, providing reliable power for commercial signs using solar power.

DESCRIPTION OF BACKGROUND

Commercial signs are a well-known method by which businesses advertise their services. For example, many businesses will have a sign located on their premises that advertises the name of the business, the hours of the businesses, prices, and other information pertinent to the business's customers. Past commercial signs have relied on standard electrical service for power. In particular, when a commercial sign is generally installed, a power line must be run to the sign. Running a power line is expensive; in cases where a sign is located in an area without easy access to electrical service, the cost of installing electrical service can exceed that of the sign.

Solar cells are also well known, and have been used to power commercial signs. The advantage of solar powered signs is that in many cases, the sign can be entirely powered by a solar array coupled to batteries. During the day, the solar array charges the batteries. At night, the batteries power the sign. This allows for the advantages of a commercial sign without requiring electrical service. However, prior art solar powered signs have one major disadvantage over commercial signs that operate using electrical service, which is that they are far less reliable. In particular, while proper sizing of the battery pack and solar array based on typical and worst case sunlight conditions to meet the requirements of a particular sign can guarantee sufficient power, the infrastructure typically used in solar powered signs does not provide a backup if many vulnerable components fail. For example, most solar powered signs rely on charge controllers; if the charge controller fails, then the entire circuit fails.

Accordingly, there is a need for a reliable solar power system, especially in connection with solar powered commercial signs.

OBJECTS OF THE DISCLOSED SYSTEM, METHOD, AND APPARATUS

Accordingly, it is an object of the disclosure to provide a reliable power infrastructure for use with a solar power device.

Another object of the disclosure is to provide a reliable power infrastructure for use with a solar powered commercial sign.

Another object of the disclosure is to provide a reliable power infrastructure for use with a solar powered commercial sign that utilizes redundant circuitry to ensure reliability.

Another object of the disclosure is to provide a reliable power infrastructure for use with a solar powered commercial sign that utilizes a logic board to switch between redundant components.

Another object of the disclosure is to provide a reliable power infrastructure for use with a solar powered commercial sign that utilizes a logic board to switch between redundant charge controllers.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a reliable solar powered sign system. The disclosed solar powered sign system includes an electric light and a battery unit. The battery unit comprises a first battery bank and a second battery bank. The battery unit generally provides power to the electric sign. A solar array produces electric power when sufficient light is present. The solar array is coupled to a control unit. The control unit includes a first charge controller coupled to the first battery bank and a second charge controller coupled to the second battery bank. The control unit also includes a logic board that is coupled to the first charge controller and the second charge controller. The logic board monitors the operational state of the first charge controller and the operational state of the second charge controller. When the operational state of the first charge controller indicates that the battery bank to which it is coupled has a greater charge reserve, the first charge controller can be coupled to a power output of the logic board. On the other hand, when the operational state of the second charge controller indicates that the battery bank to which it is coupled has a greater charge reserve, the second charge controller can be coupled to a power output of the logic board.

In additional embodiments, the system can further comprise a user programmable timer coupled to the logic board. The user programmable timer is configured by a user to produce an active signal during a certain time period, which can repeat daily, or on some other basis. Only when the active signal is present is one of the charge controllers coupled to a power output of the logic board, and from there, to the electric sign.

Similarly, the system can further comprise a photocell coupled to the logic board. The photocell produces an active signal when ambient light falls below a certain level; typically, when there is no longer enough sunlight to power the electric sign and charge the battery unit. Only when the active signal is present is one of the charge controllers coupled to a power output of the logic board, and from there, to the electric sign.

Further, the logic board can comprise a first relay and a second relay. An input contact of the first relay is coupled to a power output of the first charge controller. An output contact of the first relay is coupled to an input contact of the second relay, and an output contact of the second relay is coupled to a power output of the logic board.

The logic board can also comprise a third relay and a fourth relay. An input contact of the third relay is coupled to a power output of the second charge controller. An output contact of the third relay is coupled to an input contact of the fourth relay. An output contact of the fourth relay is coupled to a power output of the logic board.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of a reliable solar powered sign system constructed in accordance with this disclosure.

FIG. 2 is a block diagram of a reliable solar powered sign system constructed in accordance with this disclosure.

FIG. 3 is a listing logic used to activate an electric sign.

Figure 4:
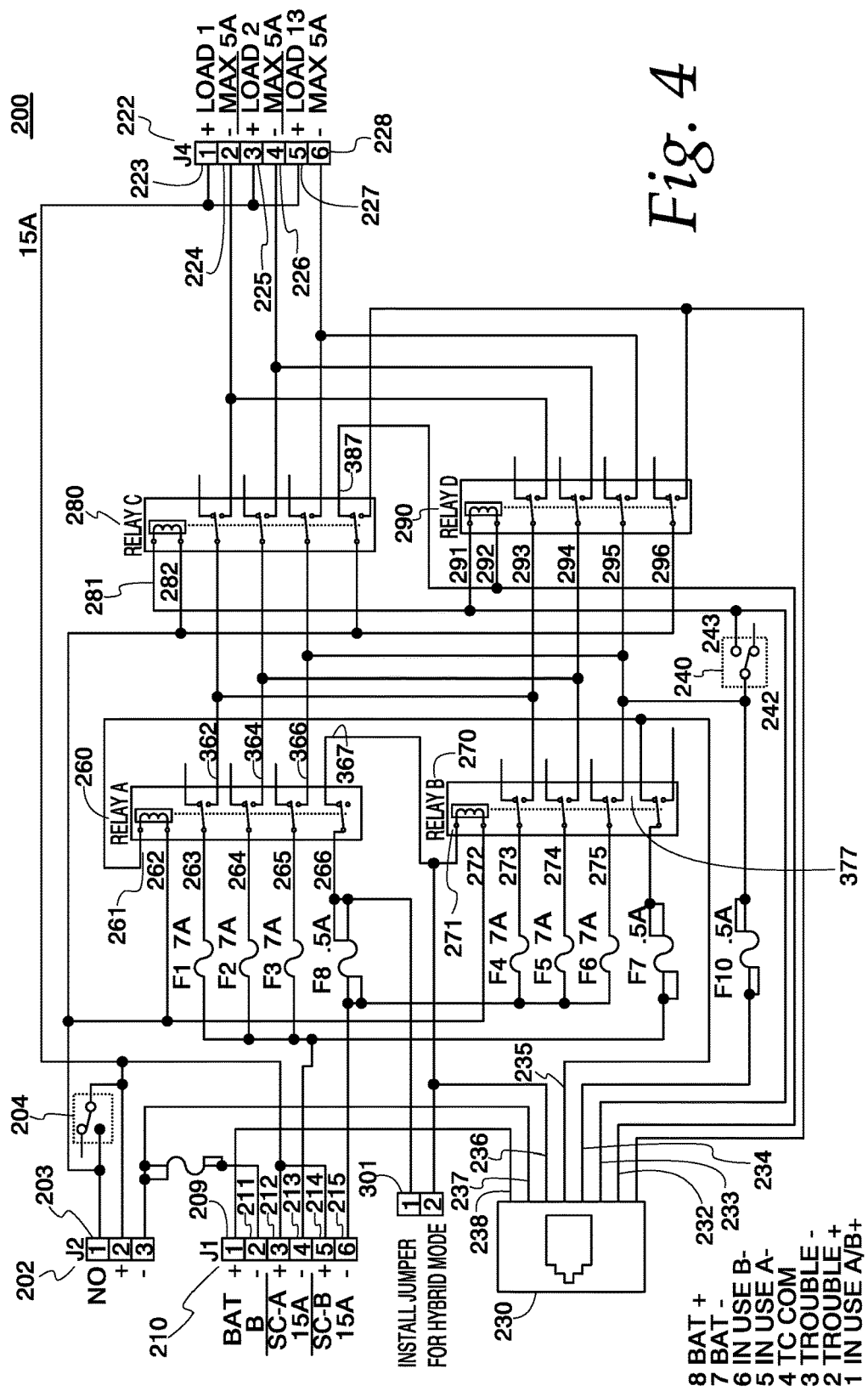
FIG. 4 is detailed schematic view of a logic board for use with a reliable solar powered sign system constructed in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Turning to the Figures and to FIG. 1 in particular, a reliable solar powered sign system constructed in accordance with this disclosure is depicted and generally indicated at 100. The illustrated system 100 includes an electric powered sign 102 of the type that is well known in the art. In particular, the electric powered sign 102 includes a display 102a that allows the electric powered sign 102 to indicate basic information in a manner that is visible anytime of the day; i.e., using lights, a backlit LCD, etc. The electric powered sign 102 is powered and controlled by a power-control cord bundle 108, which is shown routed through a pole 103, although other routing mechanisms can be used. As depicted, the power-control cord bundle 108 is routed into and through a battery unit 112. The battery unit 112 includes an array of batteries, which could be, for example, lead-acid batteries, as well as associated support circuitry; i.e., connectors, cabling, etc., as is well known in the art and not discussed herein. As set forth herein, there are two separate battery units, 112a and 112b, to provide complete redundancy.

The disclosed reliable solar powered sign system 100 further includes a control unit 116. The control unit 116 includes a logic board, charging units, and other equipment as explained further herein. The control unit 116 generally controls the operation of the sign 102 and charges the battery unit 112 when conditions permit. Finally, the disclosed reliable solar powered sign system 100 includes a solar array 124. The solar array 124 should be sized to produce sufficient power to operate the sign 102 during daytime hours and to provide sufficient additional charge to charge the batteries so that they can operate the sign 102 at night when solar power is not available. The solar array 124 comprises a plurality of solar cells, which can be any type of solar cell that is suitable, including, but not limited to, a multijunction cell, a single junction Gallium Arsenide cell, a Crystalline Silicon cell; a Thin-Film Technology cell, a Dye Sensitive cell, a Perovskite cell, an Organic cell, an Organic Tandem cell, a Quantum Dot cell, or other cells that are known in the art. In particular, as is well known in the art, solar cells generally convert sunlight into direct current electricity which is conditioned by charge controllers (explained below) within the control unit 116.

Turning to FIG. 2, a block diagram of the disclosed reliable solar powered sign system 100 of FIG. 1 is depicted with additional detail. In particular, the electric powered sign 102 further comprises a display 102a, which likely includes an integrated controller (not shown), along with a power module 102b. The electric powered sign 102 is powered by a battery unit 112, which comprises a first battery bank 112a and a second battery bank 112b. The battery banks 112a,b are sized to allow the sign 112 to operate during the entire period that solar energy is not available to charge the battery unit 112 and power the sign 102.

The primary responsibility of the control unit 116 is to accept power from the solar array 124 and use that to charge the battery unit 112 and power the sign 102. As set forth below, the control unit 116 further comprises a first redundant charge controller 116a and a second redundant charge controller 116b. The first charge controller 116a is coupled to the first battery bank 112a, while the second charge controller 116b is coupled to the second battery bank 112b. Each charge controller 116a,b conditions power from the solar panel 124 (when available) so as to provide a stable DC power source for each battery bank 112a,b. The logic board 116c performs a number of critical functions as set forth herein. The most important function of the logic board 116c is to activate the sign 102 in accordance with the desires of a user. In particular, the logic board 116c is adapted to activate the electric sign 102 based on outputs from a timer 116d and a photoeye 116e. In particular, the electric sign 102 is activated if the timer 116d outputs active and the photoeye 116e outputs active. The timer 116d can output active under two circumstances. First, the timer 116d can be bypassed; i.e., the user can manually operate a switch on the logic board 116c or the timer 116d to place it into bypass mode; i.e., where the output from the timer 116d always indicates active. Second, the timer 116d outputs active during a user configured time period, such as between 7 PM and 11 PM. The photoeye 116e also outputs active under two circumstances as well. First, as with the timer 116d, the photoeye 116e can also be put into bypass mode by the user operating a switch on the logic board 116c, and, while in bypass, the photoeye 116e will output active. Second, the photoeye 116e also outputs active when the ambient light level presented to the photoeye 116e falls below a certain level; typically, the level of light necessary for the solar array 124 to generate sufficient power to operate the sign 102 and charge the battery banks 112a,b. This logic is illustrated in FIG. 3.

As can be seen in FIG. 3, a user can configure the electric sign to operate 1) on a timer, such as from 5 PM until 10 PM every night, 2) when the level of ambient light falls below a certain level; i.e.; when it starts to get dark, or 3) a combination of the two, such as, for example, between 5 PM and 10 PM starting when the ambient light level indicates that twilight is starting. This allows the user additional control over previous systems, which generally only allowed the user to operate the electric sign based on a timer.

Returning to FIG. 2, the other function of the logic board 116c is to maintain power to the sign if one of the battery banks 112a,b, charge controllers 116a,b, or even part of the logic board fails. In particular, the logic board 116c includes logic to determine whenever a particular component has failed, and to bypass the failed component to ensure up time for the sign 102. To start, the logic board monitors the operation of the first charge controller 116a and the second charge controller 116b, and based on the operational state of each, determines which charge controller 116a,b is coupled to the electric sign 102. For example, if the battery bank 112a coupled to the first charge controller 116a has a remaining capacity of 80% and the battery bank 112b coupled to the second charge controller 116b has a remaining capacity of 60%, then the first charge controller 116a (and by extension the first battery bank 112a) will be coupled to the electric sign 102.

Turning to FIG. 4, a detailed schematic of one embodiment of the logic board 200 is depicted. It should be noted that this is merely one embodiment, and other embodiments could be used; for example, a microprocessor or microcontroller could be used. The logic board 200 can be constructed using any suitable technology. For example, a double-sided PC board could be used along with standard through hole components. Alternatively, the logic board could be constructed of a smaller four-layer PC board utilizing surface mount components. Finally, while the term logic board 200 is used throughout, this is equally applicable to a configuration that implements the functionality of the logic board 200 onto a single chip, or onto other components of the system.

The logic board 200 accepts inputs from a photocell connector 202 to which a light sensing photocell (also referred to herein as a photoeye) can be connected. The normally open (NO) terminal of the photocell connector 202 is coupled to a bypass switch 204. When the bypass switch 204 is thrown, the normally open terminal of the photocell connector is coupled the positive terminals 223, 225, 227 of the load connector 222.

An Ethernet connector 230 connects the logic board 200 to an external timer (not shown) using a CAT5 cable (not shown). The external timer is powered by an external battery bank (not shown), which is coupled to terminals 209 and 211 of six-terminal connector 210. In particular, the negative BAT B terminal 211 is connected to the negative terminal of the photocell connector 202 and to terminal 237 of the timer connector 230. The positive BAT B terminal 209 is connected to terminal 238 of the timer connector 230.

The logic board 200 also includes a six-terminal load connector 222. As drawn, there are three separate load hookups. The first load hookup comprises pins 223 and 224. The second load hookup comprises pins 225 and 226. The third load hookup comprises pins 227 and 228. In the disclosed embodiment all of the load hookups are turned on or off at the same time, although this is not a limitation of the disclosed reliable solar power system. In addition, a person of ordinary skill in the art would understand that any number of load hookups could be used as long as the appropriate components were selected.

Pin 234 of connector 230 is coupled to a user operated switch 240, which, when operated, allows the timer to control operation of the electric sign 102 as outlined herein.

Returning to connector 210 pins 212 and 213 are outputs from a first charge controller 116a. When active, the first charge controller 116a will output conditioned power for use in charging the main battery bank 112. Pin 212, the positive output of the first charge controller 116a, is connected to the positive terminals of all three load hookups; i.e., to pins 223, 225, and 227. Pin 214, the positive output of the second charge controller 116b, is also connected to the positive terminals of the three load hookups; i.e., pins 223, 225 and 227.

The main function of the logic board 200 is accomplished by four relays; 260, 270, 280 and 290, all of which are four pole double throw (4PDT). The positive terminals of relays 260, 270 and 280; i.e., pins 262, 272, 282; are connected to pin 203 of the photocell connector 202; i.e., the normally open contact of the photocell. The negative terminal of relay 290's coil; i.e., pin 291 is also connected to the normally open contact of the timeclock bypass switch 240; i.e., pin 243.

The negative terminal 213 of the first charge controller 116a is connected to the inputs of three contacts of a first four pole double throw relay 260. In particular, the negative terminal 213 of the first charge controller 116a is connected to terminals 263, 264 and 265 of relay 260. The coil of relay 260 is operated by either the photocell or timer as explained herein. Pin 262, which is the positive of the coil of relay 260 is coupled to pin 203 of photocell connector 202.

Pin 261, which is the negative terminal of the coil of relay 260 is coupled to pin 235 of the timer connector 230. This is to prevent both charge controllers from being hooked to the output at the same time. When the coil of relay 260 is energized the outputs of relay 260; i.e., pins 362, 364 and 366 are all coupled to the negative terminal of the first charge controller 116a.

Similarly, the negative terminal 281 of the coil of relay 280 is coupled to the normally open terminal 243 of the timeclock bypass switch 240. When the bypass switch is activated, terminal 242 of the switch is connected to terminal 243, which allows the timer signal on pin 233 of the timer connector 230 to operate the coil of relay 280.

When the coils of relays 260 and 280 are energized, the negative terminal 213 of the first charge controller 116a is coupled through both relays to the negative terminals of the load hookups; i.e., to pins 224, 226, and 228. When the coil of relay 270 is energized, its outputs can also be coupled through the first three poles of relay 280.

The operation of relays 270 and 290 is similar to the operation of relays 260. and 280 In particular, the negative terminal 215 of the second charge controller output is connected to the input of pole four of relay 260; i.e., terminal 266; as well as to the inputs of the first three poles of relay 270; i.e., to terminals 273, 274, and 275. The negative terminal 271 of the coil of relay 270 is connected to pin 236 of the timer connector 230. In addition, when jumper 301 is installed, the negative terminal 271 of the coil of relay 270 is connected to the negative terminal of the second charge controller 215. When the coil of relay 270 is energized the negative terminal of the second charge controller 116b is connected to the output of the first three poles of relay 270.

The positive terminal 292 of the coil of relay 290 is coupled to pin 232 of the timer connector 230. When the coil of relay 290 is energized, its inputs, which are pins 293, 294, and 295 are coupled to the outputs of the first three poles of either relay 260 or 270, depending on which relays' are in the active state, are coupled to the load hookup, namely pins 224, 226, and 228. Of course, it is impossible for the coils of both relays 260 and 270 to be energized at the same time; in particular, the output of the fourth pole 367 of relay 260 is coupled to the negative terminal 271 of the coil of relay 270. Similarly, the output of the fourth pole 377 of relay 270 is coupled to the negative terminal 261 of the coil of relay 260.

In addition, a similar technique is used to guarantee that the coils of relays 280 and 290 are not energized at the same time. In particular, the normally closed terminal 387 of the fourth pole of relay 280 is coupled to the positive terminal 292 of the coil of relay 290. Accordingly, whenever relay 280 is active; i.e., the normally open contact is energized, relay 290 will immediately open.

In summary, the operation of logic board 200 is as follows. Relays 260 and 270 are coupled to the battery banks through the charge controller. The battery bank with the greater capacity is selected as the active battery bank, and the appropriate relay is activated. Relay 280 is the main power output. As long as relay 280 is functional, the output of relay 260 or 270 is routed through the main power output. On the other hand, if relay 280 fails, and, for example, cannot open, then power will be routed through relay 290, which is the auxiliary relay. It should be also be noted none of the relays will be pulled in if the photoeye/timer logic indicates that the electric light should not be activated.

While the above system has been described in terms of a first battery bank 112a and a second battery bank 112b, the logic board described above could be used to switch between a battery bank and a utility electric line (which would have to be rectified and conditioned to DC).

Figure 5:
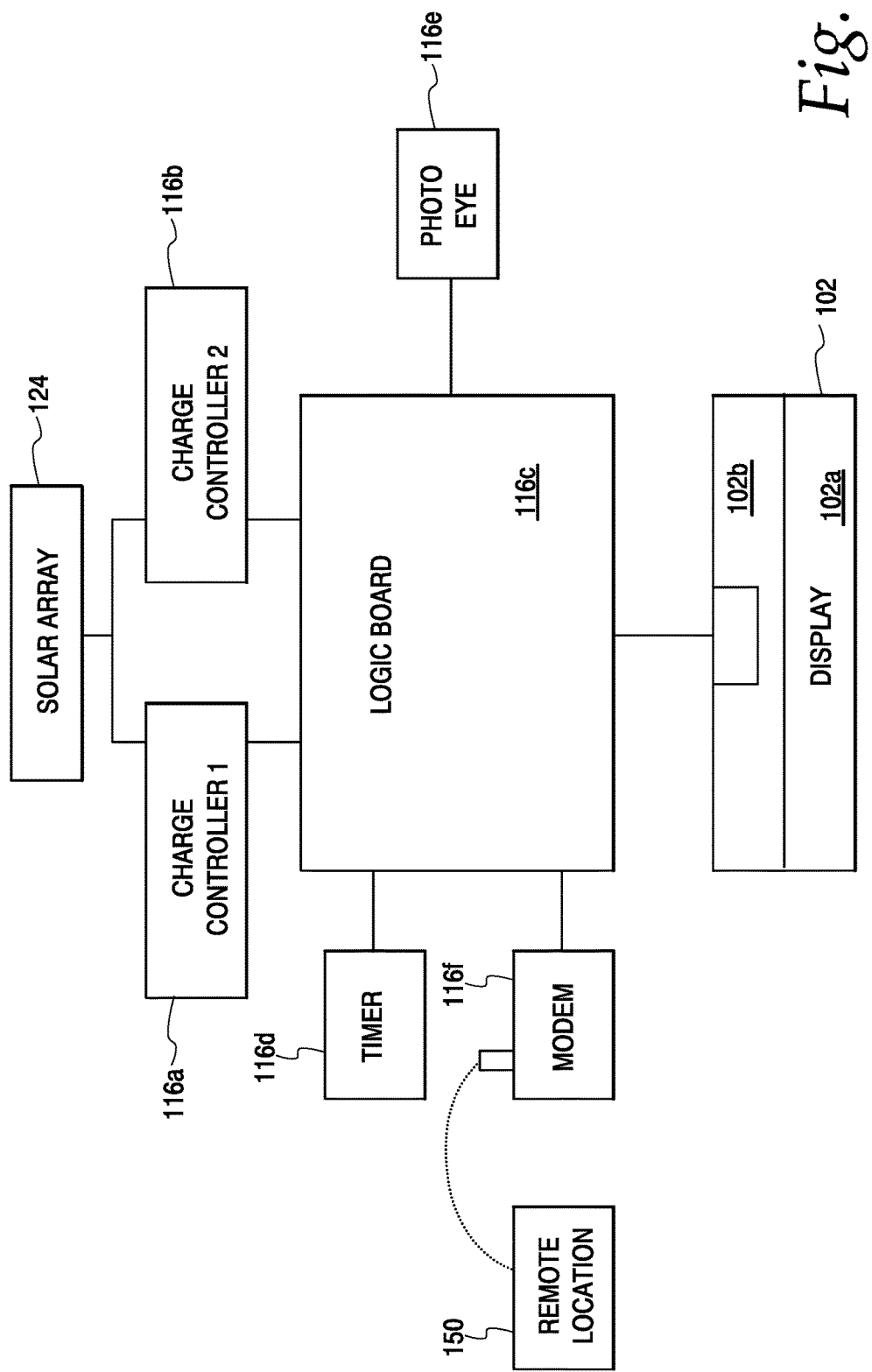
FIG. 5 is an alternative block diagram of a reliable solar power sign system constructed in accordance with this disclosure.

Turning to FIG. 5, an additional block diagram depicting an additional embodiment of a reliable solar power system is depicted. FIG. 5 is identical to FIG. 2 with the exception that a cellular modem 116f is also coupled to the logic board 116c. The cellular modem 116f is adapted to communicate status information about the sign to a different location, such as a monitoring server. For example, if the main power output relay described above fails, a message can be sent via the cellular modem 116f to a remote location 150.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A reliable solar powered sign system comprising:
   i) an electric sign;
   ii) a solar array;
   iii) a battery unit comprising a first battery bank and a second battery bank;
   iv) a control unit, the control unit coupled to the solar array and the battery unit, the control unit comprising a first charge controller coupled to the first battery bank, a second charge controller coupled to the second battery bank, and a logic board, wherein the logic board:
   1) monitors an operational state of the first charge controller;
   2) monitors an operational state of the second charge controller; and
   3) based on the operational state of the first charge controller and second charge controller, couples one of the charge controllers to the electric sign.

2. The system of claim 1 further comprising a user programmable timer coupled to the logic board, the user programmable timer being adapted to produce a first signal that is either active or inactive, and wherein the first signal is active during a time period selected by the user and wherein the logic board further couples one of the charge controllers to the electric sign only when the first signal is active.

3. The system of claim 1 further comprising a photocell coupled to the logic board, the photocell being adapted to produce a second signal that is either active or inactive, wherein the second signal is active when an ambient light level detected by the photocell is below a predetermined level and wherein the logic board further couples one of the charge controllers to the electric sign only when the second signal is active.

4. The system of claim 1 wherein the logic board further comprises a first relay and a second relay, and wherein an input contact of the first relay is coupled to a power output of the first charge controller and wherein an output contact of the first relay is coupled to an input contact of the second relay and wherein an output contact of the second relay is coupled to a power output of the logic board, and wherein the power output is coupled to the electric sign.

5. The system of claim 4 wherein the logic board further comprises a third relay and a fourth relay, and wherein an input contact of the third relay is coupled to the power output of the second charge controller and wherein an output contact of the third relay is coupled to an input contact of the fourth relay and wherein an output contact of the fourth relay is coupled to the power output of the logic board.

6. The system of claim 5 wherein a coil of the fourth relay is coupled to an output contact of the second relay so that if the output contact of the second relay is opened, the coil of the fourth relay is energized and wherein an output contact of the fourth relay is coupled to the power output of the logic board.

7. A control unit for use with a reliable solar powered sign system, the reliable solar powered sign system including an electric sign, a battery unit comprising a first battery bank and a second battery bank, and a solar array, the control unit comprising:
   i) a first charge controller coupled to the first battery bank and having an operational state;
   ii) a second charge controller coupled to the second battery bank and having an operational state;
   iii) a logic board, wherein the logic board:
   1) monitors the operational state of the first charge controller;
   2) monitors the operational state of the second charge controller; and
   3) based on the operational state of the first charge controller and second charge controller, couples one of the charge controllers to the electric sign.

8. The control unit of claim 7 further comprising a user programmable timer coupled to the logic board, the user programmable timer being adapted to produce a first signal that is either active or inactive, and wherein the first signal is active during a time period selected by the user and wherein the logic board further couples one of the charge controllers to the electric sign only when the first signal is active.

9. The control unit of claim 7 further comprising a photocell coupled to the logic board, the photocell being adapted to produce a second signal that is either active or inactive, wherein the second signal is active when an ambient light level detected by the photocell is above a predetermined level and wherein the logic board further couples one of the charge controllers to the electric sign only when the second signal is active.

10. The control unit of claim 7 wherein the logic board further comprises a first relay and a second relay, and wherein an input contact of the first relay is coupled to a power output of the first charge controller and wherein an output contact of the first relay is coupled to an input contact of the second relay and wherein an output contact of the second relay is coupled to a power output of the logic board, and wherein the power output is coupled to the electric sign.

11. The control unit of claim 10 wherein the logic board further comprises a third relay and a fourth relay, and wherein an input contact of the third relay is coupled to a power output of the second charge controller and wherein an output contact of the third relay is coupled to an input contact of the fourth relay and wherein an output contact of the fourth relay is coupled to the power output of the logic board.

12. The control unit of claim 11 wherein a coil of the fourth relay is coupled to an output contact of the second relay so that if the output contact of the second relay is opened, the coil of the fourth relay is energized.

13. A logic board for use with a control unit of a reliable solar powered sign system including a battery unit, the battery unit having a first battery bank and a second battery bank, the control unit including a first charge controller coupled to the first battery bank and having a first operational state and a second charge controller coupled to the second battery bank and having a first operational state, and wherein the logic board:

i) monitors the operational state of the first charge controller;
ii) monitors the operational state of the second charge controller; and
iii) based on the operational state of the first charge controller and second charge controller, couples one of the charge controllers to an electric sign.

14. The logic board of claim 13 further comprising a user programmable timer input, the user programmable timer input being adapted to accept a first signal that is either active or inactive, and wherein the logic board further couples one of the charge controllers to the electric sign only when the first signal is active.

15. The logic board of claim 13 further comprising a photocell input, the photocell input being adapted to accept a second signal that is either active or inactive, and wherein the logic board further couples one of the charge controllers to the electric sign only when the second signal is active.

16. The logic board of claim 13 wherein the logic board further comprises a first relay and a second relay, and wherein an input contact of the first relay is coupled to a power output of the first charge controller and wherein an output contact of the first relay is coupled to an input contact of the second relay and wherein an output contact of the second relay is coupled to a power output of the logic board.

17. The logic board of claim 16 wherein the logic board further comprises a third relay and a fourth relay, and wherein an input contact of the third relay is coupled to a power output of the second charge controller and wherein an output contact of the third relay is coupled to an input contact of the fourth relay and wherein an output contact of the fourth relay is coupled to a power output of the logic board.

18. The logic board of claim 17 wherein a coil of the fourth relay is coupled to an output contact of the second relay so that if the output contact of the second relay is opened, the coil of the fourth relay is energized.

19. The logic board of claim 18 wherein an output contact of the fourth relay is coupled to a cellular modem and wherein the cellular modem is adapted to contact a remote site when the coil of the fourth relay is energized.

* * * * *